June 12, 1962
J. S. MOLAN
3,038,746
HANDLE SHANK ATTACHMENT ARRANGEMENT
AND METHOD FOR MAKING SAME
Filed Sept. 10, 1959
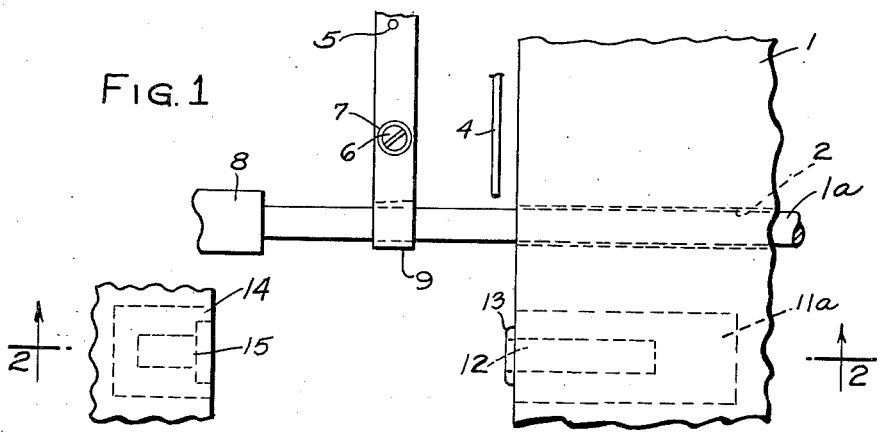
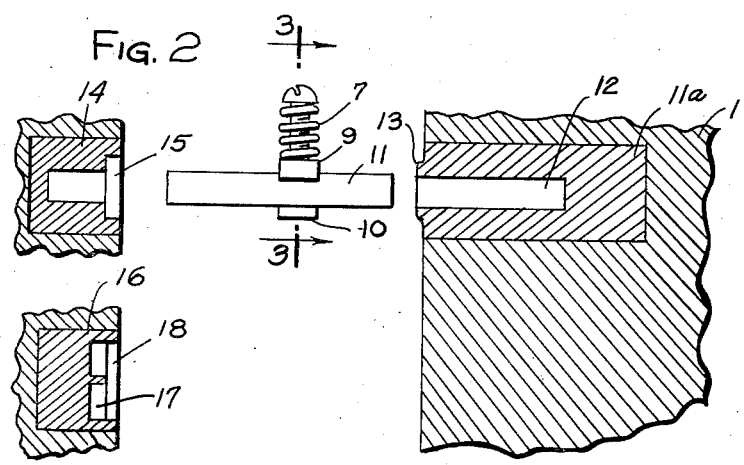
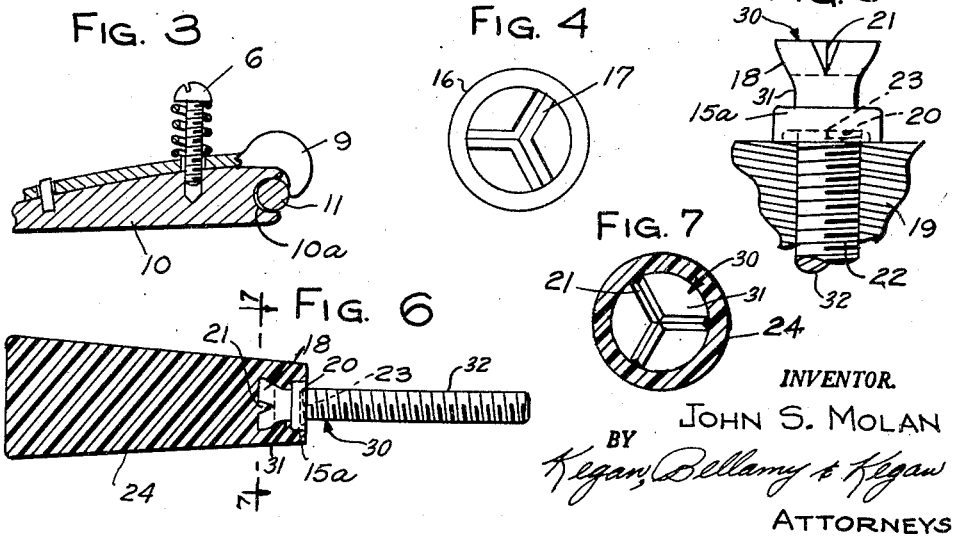
INVENTOR.
JOHN S. MOLAN
BY
Kegan, Bellamy & Kegan
ATTORNEYS

United States Patent Office 3,038,746
Patented June 12, 1962

3,038,746
HANDLE SHANK ATTACHMENT ARRANGEMENT AND METHOD FOR MAKING SAME
John S. Molan, Elk Grove Village, Ill., assignor to C.S.M. Screw Products Company, Chicago, Ill., a corporation of Illinois
Filed Sept. 10, 1959, Ser. No. 839,194
1 Claim. (Cl. 287—20.2)

This invention relates in general to an improved arrangement for attaching a shank to a moldable or castable handle and the combined handle and shank to an object for use, and to the method for manufacturing the shank.

In the conventional handle shank manufacturing procedure, wire or rod is fed into an upsetting machine and automatically cut to the desired size. After cutting, each piece is automatically transferred to another position in the machine, where the wire is compressed or upset between a pair of dies, one of which is in the reciprocating head of the machine and the other in the head, to form a collar thereon. The collar is used to seat the shank in the mold in which the handle is formed. The wire must then be transferred to another machine, wherein a portion of the wire on one side of the collar is knurled, or its surface otherwise deformed and/or serrated to provide a surface whereby the molded handle grabs the shank to prevent separation therebetween. In addition, after the upsetting and knurling process, screw threads are formed in the portion of the shank on the other side of the collar by means of a pair of dies arranged to squeeze or roll the threads thereon by deforming the shank surface. The threads enable the attachment of the shank and handle to the object with which it is to be used.

As a rule, the handle is formed in the mold either by injection molding in the case of plastic material or by die casting in the case of metallic materials. The knurled portion of the shank is placed in the mold so that the molded material flows into the indentations in the surface of the shank, to prevent separation of the shank from the molded material on setting. As the supporting material in the area of contact between the handle and the shank are developed by the knurling, for resisting thrust in any particular direction, is comparatively small, it is not unusual to find that separation of handle and shank occurs frequently, especially if subjected to heavy pressure.

In the present invention, the step of transferring the shank to a knurling machine is eliminated, and the upsetting machine is used to form a handle grabbing or clutching shank portion comprising a notched flared portion at one end of the shank. This is done by providing a die for the reciprocating head of the upsetting machine, which has an aperture containing wedges at the back thereof. When it is brought against the end of the shank, the wedges notch the shank while simultaneously causing the end of the shank to flare outward. With this shank structure, the molded material on filling the notches provides a large surface area with excellent supporting for resisting turning of the handle with respect to the shank, while the flared portion likewise being of comparatively considerable dimension prevents back thrust from separating the handle from the shank.

Further in the present invention, the addition of an annular ring or ridge adjacent the hole in one of the dies, which receives the shank in the upsetting machine, causes a recess to be formed in the shank collar. When the thread is subsequently rolled onto the shank, the deformation of the shank surface causes a thread portion to be formed in the recess. With the additional thread length, the handle and shank may be screwed into tighter union with the object with which it is to be used.

It is, therefore, an object of this invention to provide an improved arrangement for fastening a shank to a material which is molded or cast thereon.

It is another object of this invention to provide a shank arrangement, which permits an improved union to be formed between a handle carried by the shank and the object to which it is to be attached.

It is still another object of this invention to provide a method of manufacture for a shank of the character described.

It is a feature of this invention to form a shank having a notched flared portion on one end thereof to permit improved adherence to a material molded or cast therearound.

It is another feature of this invention to provide a collar on a shank of the type described having a recess therein whereby a thread is formed therein and on said shank to permit said shank to be returned by a handle into close union with another object adapted to receive the threaded shank.

It is another feature of this invention to provide a method for forming the aforedescribed collar and flared portion on a shank as part of a conventional upsetting operation.

The foregoing and other objects and features of the invention, and the manner of obtaining them, will become more apparent, and the invention itself will be best understood, by reference to the following description of an embodiment of the invention taken in conjunction with the accompanying drawings comprising FIGS. 1 to 7, wherein:

FIG. 1 of the present invention shows portions of a conventional upsetting machine wherein rod or wire is fed and cut to a desired length for insertion in a die in the bed of the machine;

FIG. 2 is a section taken along the line 2—2 in FIG. 1 to show the arrangement of the various dies, and also shows a shank blank 11 cut to size;

FIG. 3 is a section taken through the line 3—3 in FIG. 2 to show the structure of the wire gripping finger 10;

FIG. 4 is an end view of the die 16;

FIG. 5 shows how the shank is arranged with respect to the moving pair of dies in a thread rolling machine for rolling or squeezing threads thereon, by deforming the shank surface, in any well known manner;

FIG. 6 shows the assembly of the shank and a molded handle 24; and

FIG. 7 is a section taken along the line 7—7 of FIG. 6.

Referring now to FIG. 1, it will be seen that the wire 1a or rod is fed through an aperture 2 in the bed 1 of the upsetting machine, until a wire portion of the desired length protrudes therebeyond as determined by the setting of the stop 8. The wire extends through the recess 10a in the wire gripping finger 10 and is held in the recess by the spring biased locking arm 9 as seen in FIG. 3. The cutter 4 is now reciprocated to cut the wire to form the shank blank 11 (FIG. 2) of the desired length.

The gripping finger 10 holding the shank blank 11 now moves the blank in alignment with the aperture 12 in the die 11a set in the bed 1 of the machine and the aperture 15 of the die 14 set in the head of the machine.

The head of the machine carrying the die 14 is now moved forward toward die 11a. With the blank 11 in alignment with apertures 12 and 15, the die 14 presses the blank 11 into these apertures. The gripping finger 10 is simultaneously withdrawn.

As the finger 10 is withdrawn, the blank 11 held between dies 11a and 14 forces the locking arm 9 upwards to free the finger 10 from the blank 11. The arm 9 is affixed to the top of finger 10 by means of screw 6, spring 7 and pin 5. The aperture through which screw 6 passes is large enough to permit arm 9 to pivot upwards to free the finger 10 from the blank 11, while spring 7 biases the arm 9 to enable the blank to be firmly held in position, when finger 10 is carrying the blank. The finger 10 and arm 9 are withdrawn to the position indicated in FIG. 1 so that another wire portion may be received.

With die 14 brought forward to exert pressure against the end of blank 11, the blank spreads or upsets to fill the aperture 15 in die 14. With the particular aperture 15, the blank 11 is formed in the same shape to provide the collar 15a thereon as seen in FIGS. 5, 6 and 7. Additionally, the annular portion 13 on die 11 causes a recess 20 to be formed on the mating side of the collar 15a, as seen in FIGS. 5 and 6. Die 14 is then retracted and the head of the machine raised to bring die 16 into alignment with the blank 11.

Die 16 is now forced against the end of the blank 11. The aperture 18 formed in die 16 is of larger diameter than the end of blank 11 and contains at the back thereof the wedge-shaped protrusions 17 set at an angle of approximately 120° to each other. When the wedge-shaped protrusions 17 are brought to bear against the end of the blank 11, the blank 11 is again upset and wedge-shaped grooves 21 corresponding to 17 are formed therein while the substantially circumferential flare 18 is simultaneously formed adjacent the end of the blank 11, as seen in FIGS. 5 and 6.

The die 16 is now retracted and the flared and collared blank is withdrawn for further processing. This blank (or formed shank) is shown at 30 in FIGS. 5, 6, and 7. It comprises a handle portion 31 (FIGS. 5 to 7) to be molded into a handle 24 (FIG. 6), and a fastening stem 32 (FIGS. 5 and 6). Such blank, or shank, 30 is next placed in a conventional thread rolling machine.

As illustrated in FIG. 5, the thread-rolling machine within which shank 30 is placed comprises a pair of dies 19 between which stem 32 is placed. They are arranged as hereinbefore noted to squeeze its surface material to provide threads 22 thereon in any well-known manner. These threads are to enable the attachment of the shank-and-handle combination to the object with which it is to be used. Because of the recess 20 in the collar 15a, the surface material of the shank is permitted to deform therein under pressure of the thread rolling dies 19 to form a thread portion 23 in the recess.

As is shown in FIG. 5 by the 90-degree angle between the vertical side limits of stem 32 and the top line of each of the two dies 19, and by the illustrated exact horizontal alignment of the top face of each die 19 (seen in edge view) with the top face of the other die 19 and with the bottom face of collar 15a, the two dies 19 (one on the left of stem 32 and the other on the right thereof) meet stem 32 at substantially right angles, if not precisely so, in the thread-completed position shown, which is common for the usual square-jawed thread-rolling or thread-cutting dies. It is well understood that thread-producing dies of each noted type start well away from their thread-completed position and cut their way, or roll their way, along a rod or stem 32 until they reach their thread-completed finish position shown in FIG. 5 for rolling dies 19, where they are tight against the annular face (not shown in plan view) of collar 15a. With thread producers of either noted type, recess 20 insures that the diameter of that portion of stem 32 which extends outwardly from the plane of the annular face of collar 15a (whether the stem be fully threaded or only partly threaded) can be substantially uniform throughout, to the end that a sharp-cornered hole which receives the outer end portion of stem 32 with significant clearance can receive all of the portion of that stem which so extends outwardly from the plane of the annular face of the collar. From these considerations it is clear that, with square-jawed thread producers of either type which produce substantially a full thread, the prime function of the annular recess 20 seen in broken-line outline in FIGS. 5 and 6 (formed between counterbore 15 of die 14 of FIG. 2 and boss 13 of die 11a) is to receive material turned up as burrs on stem 32 in thread cutting, or displaced along that stem by the rolling operation occurring in thread rolling. Accordingly, for a square-jawed thread producer of either noted type the references herein to a thread portion being formed in the recess 20 are clearly references to material displaced into recess 20 by the threading operation, and any related reference herein to additional thread length resulting from the noted recess refers to additional usable thread length, having regard to the clear intention to maintain the diameter of stem 32 substantially uniform throughout the exposed length thereof with no significant increase in its diameter at the base of its exposed portion, to thus provide a closer union with another object adapted to receive threaded stem 32 of the shank when the receiving hole in such other object is not materially larger than the established diameter of stem 32, and is substantially sharp and unflared at its entrance, examples of which are clean bored holes through wooden drawer heads and holes punched through sheet metal.

The finished shank is now set in the mold in a conventional molding or die casting machine and a handle 24 of desired composition molded thereon in any well known manner to provide the arrangement shown in FIG. 6. It will be noted that the molded material fills the notches 21 and the area between the flare 18 and the collar 15a. Twisting of the handle 24 with respect to the shank is prevented by the molded material filling the notches 21, while pulling-apart action is resisted by the flared portion 18. Now when the shank and handle are screwed into an appropriate object the entire assembly may be turned without danger of a separation. Also, as the collar 15a and handle 24 are brought to bear thereagainst, the threaded portion 23 in the recess 20 accommodates additional forward motion to provide extremely close union with the object.

While I have described above the principles of my invention in connection with specific apparatus, it is to be clearly understood that this description is made only by way of example and not as a limitation to the scope of my invention.

I claim:

A handle shank comprising a single member of generally rodlike form having a first end portion adapted to be molded into a handle and having a second end portion adapted to be male threaded for threaded attachment to an object, the handle shank including a concentric collar surrounding an intermediate portion thereof comprising a part of said first end portion and adapted to be molded flush into said handle, the end section of the first portion being outwardly flared to resist pulling the shank out of the handle and having a plurality of radial notches to resist turning of the shank within the handle, the face of the collar from which the second portion extends having an annular recess formed therein to permit all of the exposed cylindrical surface of such portion to be threaded, together with a part of the surface of such portion within the recess, if desired.

References Cited in the file of this patent

UNITED STATES PATENTS

| | | |
|---|---|---|
| 439,830 | Berbecker | Nov. 4, 1890 |
| 1,250,597 | Kyle | Dec. 18, 1917 |
| 1,774,799 | Loudenslager | Sept. 2, 1930 |
| 2,226,006 | Maze | Dec. 24, 1940 |
| 2,294,802 | Reich | Sept. 1, 1942 |
| 2,740,136 | Chiaberta et al. | Apr. 3, 1956 |